United States Patent
Kim

(10) Patent No.: US 6,658,168 B1
(45) Date of Patent: Dec. 2, 2003

(54) METHOD FOR RETRIEVING IMAGE BY USING MULTIPLE FEATURES PER IMAGE SUBREGION

(75) Inventor: Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 475 days.

(21) Appl. No.: 09/583,221

(22) Filed: May 30, 2000

(30) Foreign Application Priority Data

May 29, 1999 (KR) .......................................... 1999-19607

(51) Int. Cl.[7] ................................................ G06K 9/54
(52) U.S. Cl. ...................... 382/305; 382/165; 707/104.1
(58) Field of Search ................................ 382/162–167, 382/305; 707/1–104.1

(56) References Cited

U.S. PATENT DOCUMENTS

| | | | | |
|---|---|---|---|---|
| 5,825,917 A | * | 10/1998 | Suzuki et al. ................ | 382/164 |
| 5,893,905 A | * | 4/1999 | Jain et al. ...................... | 707/6 |
| 6,115,717 A | * | 9/2000 | Mehrotra et al. ......... | 707/104.1 |
| 6,445,818 B1 | * | 9/2002 | Kim et al. ................... | 382/305 |

OTHER PUBLICATIONS

Carson et al. "Region–based image querying" Proc. IEEE Workshop on Content–Based Access of Image and Video Libraries, pp. 42–49, Jun. 20, 1997.*

* cited by examiner

*Primary Examiner*—Jingge Wu
(74) *Attorney, Agent, or Firm*—Fleshner & Kim, LLP

(57) ABSTRACT

An efficient method for retrieving an image using multiple features for an image subregion is disclosed. The present invention obtains a regional representative color for the subregions and uses the regional representative color during a retrieval of a similar image if the regional representative color is reliable. Otherwise, a feature information other than the regional representative color is used.

19 Claims, 2 Drawing Sheets

FIG.2

| (C00,S00) | (C01,S01) | (C02,S02) | (C03,S03) |
|---|---|---|---|
| (C10,S10) | (C11,S11) | (C12,S12) | (C13,S13) |
| (C20,S20) | (C21,S21) | (C22,S22) | (C23,S23) |

FIG.3

| H00 | H01 | H02 | H03 |
|---|---|---|---|
| H10 | H11 | H12 | H13 |
| H20 | H21 | H22 | H23 |

FIG.4

| E00 | E01 | E02 | E03 |
|---|---|---|---|
| E10 | E11 | E12 | E13 |
| E20 | E21 | E22 | E23 |

METHOD FOR RETRIEVING IMAGE BY USING MULTIPLE FEATURES PER IMAGE SUBREGION

BACKGROUND OF THE INVENTION

1. Field of the Invention

The present invention relates to a content based image retrieving system, and more particularly, to a method for retrieving an image using multiple features per subregion of an image.

2. Background of the Related Art

An image retrieving system generally searches for a reference image by extracting certain characteristics of the images. The characteristics of images may be extracted as the images are input to an image database and the extracted characteristics are stored in the image database. Subsequently, if a user requires an image search, a similarity between respective images are determined utilizing the characteristic information of a reference image and target images stored in the database.

In one image retrieving system, an image is divided into subregions and the subregion is further divided into pixel units to represent each subregion with one regional representative color, such as an average color for all pixels. The subregion information is used to match the target images with a reference image, thereby examining the similarity. However, this method does not perform as well when a plurality of colors are present in one subregion, making it difficult to represent the subregion with one regional representative color.

In another image retrieving method, the colors of all pixels in a subregion are represented with a plurality of values, such as color histogram and the image is represented using the values as the subregion information to retrieve an image. Although this method may perform better, due to the use of the plurality of color values, a longer retrieval time is necessary. For example, when using a color histogram of nth dimension, a comparison of n elements is required.

SUMMARY OF THE INVENTION

Accordingly, an object of the present invention is to solve at least the problems and disadvantages of the related art.

An object of the present invention is to provide an efficient method for retrieving an image.

Another object of the present invention is to provide an efficient method for retrieving an image using multiple features per a subregion of an image.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the method for retrieving an image using multiple features per a subregion of an image includes (1) dividing an image into subregions, extracting a regional representative color and a confidence measure of the regional representative color for each of the subregions, and extracting at least one other characteristic of the image, (2) comparing the confidence measure of the regional representative color for an extracted subregion to a threshold value, and (3) determining a similarity between a reference image and a target image using the regional representative color if the confidence measure of the regional representative color for the subregion is higher than the threshold value, and otherwise determining a similarity between a reference image and a target image using the at least one other characteristic of the image.

In the present invention, the other characteristic of the image may be one or a combination of both the a set of main colors of subregions and a frequency of each main color, and region feature information other than the color information.

BRIEF DESCRIPTION OF THE DRAWINGS

The invention will be described in detail with reference to the following drawings in which like reference numerals refer to like elements wherein:

FIG. 2 illustrates an example of representing a grid region information of an image with a regional representative color and a confidence measure of the regional representative color, in accordance with the present invention;

FIG. 3 illustrates an example of representing a grid region information of an image with a histogram, in accordance with the present invention; and FIG. 4 illustrates an example of representing a grid region information of an image with a texture information, in accordance with the present invention.

DETAILED DESCRIPTION OF THE PREFERRED EMBODIMENT

Figure 1:
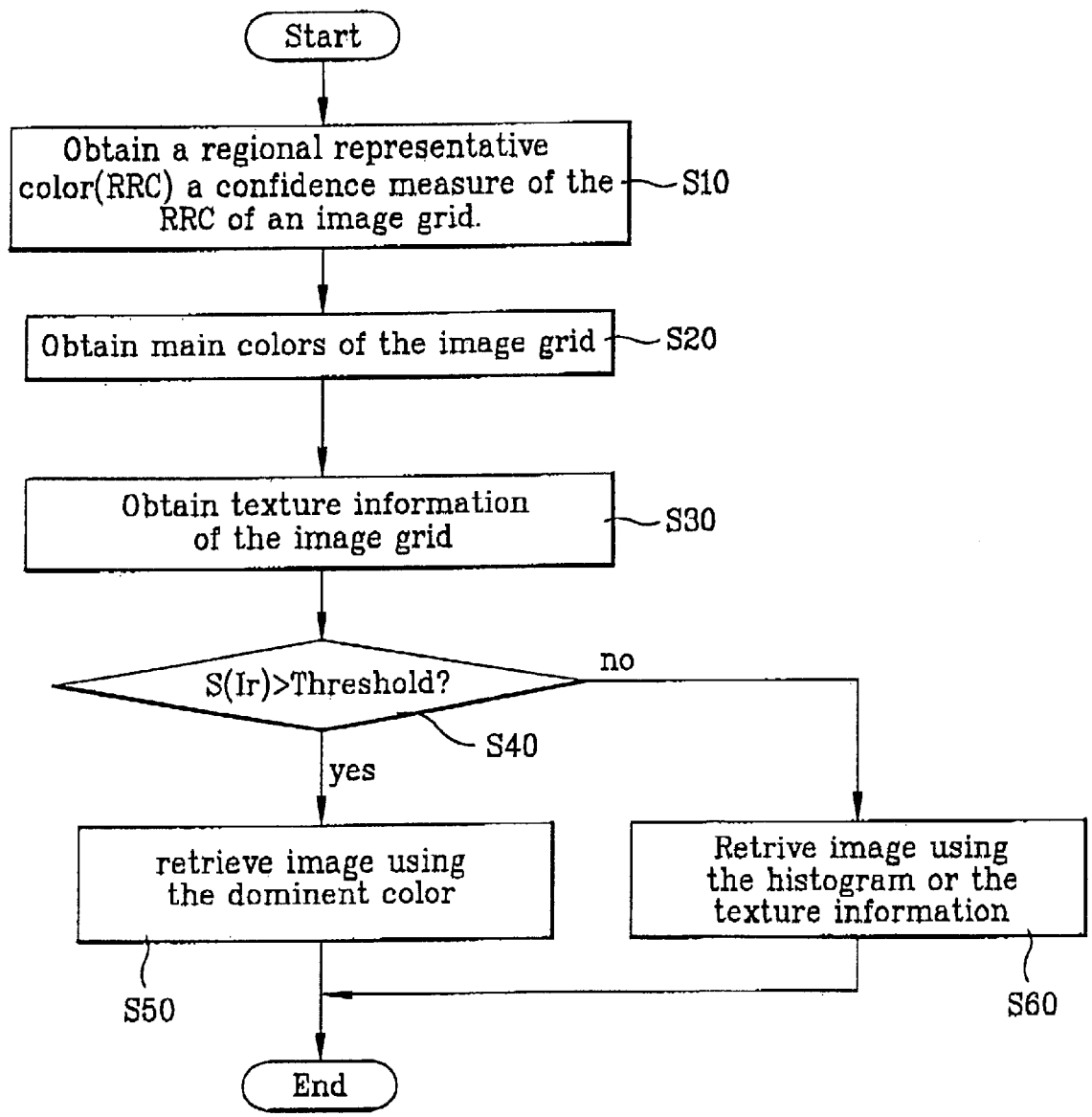
FIG. 1 is a flow chart of a method for retrieving an image in accordance to with present invention.

Reference will now be made in detail to the preferred embodiments of the present invention, examples of which are illustrated in the accompanying drawings.

Generally, multiple features such as a regional representative color of each subregion and a confidence measure of the regional representative color; a set of main colors of image subregions and a frequency of each main color; and feature information other than a color feature information Such as texture information, are used. Namely, the present method for retrieving an image determines a similarity between images using the different feature information, based upon the confidence measure of the regional representative color.

Particularly, an image is divided into subregions of arbitrary forms to obtain feature information of the image. The image may be divided into grid regions which does not require any particular segmentation method, or divided according to a method based on an object.

In the preferred embodiment, the image is divided into grid regions and the feature information includes, but is not limited to, a regional representative color and a confidence measure of the regional representative color for each image grid, a set of main colors of the image grids and a frequency of each main color, and region feature information other than the color information. Here, the regional representative color for each image grid may be obtained by an average filtering of a grid of a fixed size to obtain an average color. The set of main colors of grids and a frequency of each of the main colors may be obtained by a histogram, and the region feature information other than the color information may be obtained by a texture information such as an edge direction component.

More particularly, the regional representative color and confidence measure of the regional representative color for each image grid, and a set of main colors of the image grids and frequency of each main color, i.e. color information of an image grid (Color_in Grid_R), may be expressed by Equation 1, where RRC=(R, G, B) and is the regional representative color value and RRCS is a Confidence measure of RRC.

$$\text{Color\_in Subregion\_R} = \{RRC, RRCS\} \quad [1]$$

The RRC may be obtained at the time of retrieving an image by direct calculation rather than obtaining and storing the value in advance. Namely, the RRC may be obtained from the main colors of a grid region.

The confidence measure RRCS, in the present invention, specifies image spatial variances of the RRC. The image spatial variance of a color indicates whether a color is sufficiently coherent. To compute the confidence value, an image spatial variance of the RRC is measured by a normalized average connecting pixels of the corresponding color when all pixels of the RRC are masked using a 3×3 window. Particularly, the confidence measure RRCS can be calculated by the following algorithm.

1 Input the size of the Coherency Checking Mask CCM such as CCM_WIDTH (=3) by CCM_HEIGHT (=3).
2 COUNT_PELS_RRC=0, TOTAL_NUM_COHERENT=0.
3 For all pixels PELj in R,
  3.1 If (RRC=COLOR_OF_PELj)
    3.1.1 COUNT_PELS_RRC=COUNT_PELS_RRC+1.
    3.1.2 For all masked pixels MASKED_PIXELk (except the center pixel, PELj)
      3.1.2.1 If (RRC=COLOR_OF_MASKED_PIXELk) Goto 3.
    3.1.3 TOTAL_NUM_COHERENT++; Goto 3.
4 RRC=TOTAL_NUM_COHERENT/COUNT_PELS_RRC/(CCM_WIDTH*CCM_HEIGHT-1).
5 Output RRCS.

After the regional representative color and the confidence measure of the regional representative color for each image grid, the main colors for a plurality of the grids and the frequency of each main colors, and region feature information other than the color information are extracted, the confidence measure of the regional representative color for the extracted grid are compared to a predetermined threshold value. Although the threshold value may be set according to the accuracy nessecitated by the retrieval system, the threshold value is set to at least 5% in the preferred embodiment.

Depending upon the result of the comparison, a similarity between a reference image and a target image is determined using the regional representative color if the confidence measure of the regional representative color for the grid is higher than the threshold value. If the confidence measure of the regional representative color for the grid is lower than the threshold value, a similarity between the reference image and a target image is determined using at least one other feature information of the image. In the present invention, the other feature information includes the main colors of the grids and the frequency of each main color, and a region feature information other than the color information.

FIG. 1 shows a flowchart of a method for retrieving an image in accordance to the preferred embodiment of the present invention, where an image is divided in length and width directions by a fixed ratio, i.e. into grid regions, and each grid region or cell units. Thereafter, a regional representative color C for each cell and a confidence measure of the regional representative color C, a set of main colors such as a histogram H, and texture information such as an edge direction component are extracted (S10~S30).

FIGS. 2~4 show feature information of 4×3 grid regions of a image. Namely, FIG. 1 shows the regional representative colors {C00, C01, C02, . . . , C23} with the corresponding confidence measures of the regional representative colors {S00, S01, S02, . . . , S23}. FIG. 3 shows the image grid region information by a histogram (H00, H01, H02, . . . , H23} and FIG. 4 shows an example of representing image grid region information by texture information {E00, E01, E02, . . . , E23}.

Referring back to FIG. 1, after obtaining the regional representative color and confidence measure of the regional representative color for each cell in each grid region, the main colors, and the texture information, the confidence measure of the regional representative color C for each cell is compared to the threshold value (S40). If the confidence measure for a cell is higher than the threshold value, the regional representative color value C is determined to have sufficient reliability, Accordingly, the similarity of the image grid matching between the reference image and the target image is determined using the regional representative color (S50) according to the following equations.

$$\text{Grid\_Sim}(I_r, I_t) = \Sigma_{\text{for all } m, n} [\text{Cell\_Sim}(m, n, I_r, I_t)] \quad [2]$$

$$\text{Cell\_Sim}(m, n, I_r, I_t) = \text{Color\_Sim}(\text{Cmn\_}I_r, \text{Cmn\_}I_t) \quad [3]$$

In the above equation, $I_r$ is a reference image, $I_t$ is a target image to be retrieved, Grid_Sim is a similarity between image grids with a value ranging from 0~1, Cell_Sim is a similarity between image grid cells with a value ranging from 0~1, and Color_Sim is a color similarity between cells in the image grid with a value ranging from 0~1. Here, the color similarity is inversely proportional to a distance between two points on a color coordinate that represent the colors of two cells and decreases as the two points becomes the farther. Also, the m and n indicate a number of cells in a row and column of a grid, $C_{mn}\_Ir$ is a regional representative color value of mth and nth cell of a reference image grid, and $C_{mn}\_It$ is a regional representative color value of mth and nth cell of a target image grid.

If the confidence measure of regional representative color C for a cell in the reference image grid is greater than a threshold value, i.e. $S_{mn}\_Ir$> Threshold where $S_{mn}\_Ir$ denotes the confidence measure of regional representative color for mth and nth cell in the reference image grid, the color similarity between the reference image and a target image equals the sum of a color similarity measure between a reference image grid cell and a target image grid cell. Accordingly, the greater the similarity between the reference image grid and a target image grid, the similarity between the reference image grid and the target image grid also rises.

On the other hand, the regional representative color value C is determined not to be reliable if the confidence measure of regional representative color C for the cell in the reference image grid is smaller than the threshold value, and the similarity of image grid matching between the reference image and a target image is determined using a color histogram or texture information such as the edge direction components (S60) according to the following equations.

$$\text{Grid\_Sim}(I_r, I_t) = \Sigma_{\text{for all } m,n} [\text{Cell\_Sim}(m, n, I_r, I_t)] \quad [4]$$

$$\text{Cell\_Sim}(m, n, I_r, I_t) = A \cdot \text{Histo\_Sim}(\text{Hmn\_}I_r, \text{Hmn\_}I_t) + B \cdot \text{Tex\_Sim}(\text{Emn\_}I_r, \text{Emn\_}I_t) \quad [5]$$

In the above equations, Grid_Sim is a similarity between image grids with a value ranging from 0~1, Cell-Sim is a similarity between image grid cells with a value ranging from 0~1, and Histo_Sim is a histogram similarity between the image grids with a value ranging from 0~1. Here the histogram similarity may be an intersection of the histogram. Also, Tex_Sim is a similarity of texture components between image grids with a value ranging from 0~1, Hmn_$I_r$ is a histogram of mth and nth cell of the reference image grid, Hmn_It is a histogram of mth and nth cell of a target image grid, Emn_$I_t$ is an edge direction component of mth and nth cell of the reference image grid, Emn_$I_t$ is an edge direction component of mth and nth cell of a target image grid, and A and B are weight values of Histo_Sim and Tex_Sim, respectively.

If the confidence measure of a regional representative color C for a cell in the reference image grid is less than the threshold value, i.e. $S_{mn}$_$I_r$<Threshold where $S_{mn}$_$I_r$ denotes the confidence measure of regional representative color for mth and nth cell in the reference image grid, a similarity between a reference image grid and a target image grid equals the sum of a color histogram similarity and a texture information similarity between a reference image grid cell and a target image grid cell.

Although the preferred method for retrieving an image uses a combination of both a color histogram and a texture information in a similarity determination when the confidence measure of a regional representative color C is less than the threshold value, only one additional feature may be used by setting one of either A or B to zero. Alternatively, one of steps S20 or S30 for obtaining a color histogram or a texture histogram may be eliminated to simplify the system. In such case, the weight value for the corresponding feature information would be set to zero.

In the present invention, a faster similarity examination between grids of the reference image and a target image is provided by using only the regional representative color and the confidence measure of the regional representative color as follows.

$$\text{Grid\_Sim}(I_r, I_t) = \sum_{\text{for all } m,n} [\text{Cell\_Sim}(m, n, I_r, I_t)]$$

$$\text{Cell\_Sim}(m, n, I_r, I_t) = \frac{(\alpha + \beta \times I) \times \text{Color\_Sim}(\text{Cmm\_}I_r, \text{Cmm\_}I_t)}{(\alpha + \beta)}$$

$$\text{and} \quad I = 1 - |\text{Smn\_}I_r - \text{Smn\_}I_t|$$

In the above equation, Grid_Sim is a similarity between image grids with a value ranging from 0~1, Cell_Sim is a similarity between image grid cells with a value ranging from 0~1, Color_Sim is a color similarity between the image grid cells with a value ranging from 0~1, Cmn_$I_r$ is a regional representative color value for mth and nth cell of the reference image grid, $S_{mn\_Ir}$ is the confidence measure of regional representative color value for mth and nth cell of the reference image grid, $S_{mn}$_$I_r$ is the confidence measure of regional representative color value for mth and nth cell of a target image grid, and α and β are weight values.

In the fast image retrieval, a similarity measurement between the reference image grid and a target image grid can be obtained through a regional representative color similarity and a confidence measure of the regional representative color between the reference image grid cell and a target image grid cell.

As explained above, since a similarity between a reference image and a target image is determined using the regional representative colors if the confidence measures of the regional representative colors for grids of the image are reliable, and otherwise using a second feature information other than the regional representative colors such as main colors of grids and/or frequencies of the main colors and region feature information other than the color information, if the confidence measures of the regional representative color for grids of the image are not reliable, a more accurate and fast similarity examination can be achieved to enhance an image retrieval system.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for retrieving an image comprising:
   dividing a reference image into subregions, extracting a regional representative color and a confidence measure of the regional representative color for each of the subregions, and extracting a second feature information of the reference image;
   comparing the confidence measure of the regional representative color for each subregion to a predetermined threshold value; and
   determining a similarity between the reference image and a target image using the regional representative color if the confidence measure of the regional representative color for a subregion is greater than the threshold value, and otherwise, determining a similarity between the reference image and a target image using the second feature information of the reference image.

2. A method of claim 1, wherein the reference image is divided into subregions of any arbitrary form.

3. A method of claim 1, wherein the reference image is divided by a method based upon an object.

4. A method of claim 1, wherein the reference image is divided into grid regions.

5. A method of claim 4, wherein the regional representative color is an average color obtained by an average filtering of a grid of a fixed size.

6. A method of claim 4, wherein the second feature information of the reference image is one of or a combination of both a plurality of main colors of the grids and a frequency of each main color, and a grid feature information other than a color information.

7. A method of claim 6, wherein the plurality of main colors of the grids and a frequency of each main color ate obtained from a histogram.

8. A method of claim 6, wherein the grid feature information other than a color information is a texture information.

9. A method of claim 8, wherein the texture information is a edge direction components.

10. A method of claim 6, wherein the regional representative color of a subregion for the reference image is obtained from the plurality of main colors of the grids and a frequency of each main color at a time during a retrieval of the target image.

11. A method of claim 1, wherein the second feature information of the reference image is one of or a combination of both a plurality of main colors of the subregions and a frequency of each main color, and a subregion feature information other than a color information.

12. A method of claim 11, wherein the plurality of main colors of the subregions and a frequency of each main color are obtained from a histogram.

13. A method of claim 6, wherein the subregion feature information other than a color information is a texture information.

14. A method of claim 13, wherein the texture information is a edge direction components.

15. A method of claim 11, wherein the regional representative color of a subregion for the reference image is obtained from the plurality of main colors of the subregions and a frequency of each main color at a time during a retrieval of the target image.

16. A method for retrieving an image in an image retrieval system comprising:

dividing a reference image into grid regions;

extracting a regional representative color and a confidence measure of the regional representative color for each grid region; and performing a similarity examination between the reference image and a target image using the regional representative color and the confidence measure of the regional representative color for each grid region, wherein the performing a similarity examination uses the regional representative color if said confidence measure of the regional representative color is greater than a predetermined threshold value, and otherwise the performing a similarity-examination uses a feature information of the reference image other than the regional representative color.

17. A method of claim 16, wherein the feature information of the reference image other than the regional representative color is a color histogram and a texture information.

18. A method of claim 16, wherein the feature information of the reference image other than the regional representative color is a color histogram.

19. A method of claim 16, wherein the feature information of the reference image other than the regional representative color is a texture information.

* * * * *